United States Patent
Myers et al.

(10) Patent No.: US 7,667,746 B2
(45) Date of Patent: Feb. 23, 2010

(54) METHOD AND APPARATUS FOR PROGRAMMABLY SETTING A SAMPLING DELAY IN AN IMAGE SENSOR DEVICE

(75) Inventors: Charles Grant Myers, Corvallis, OR (US); Jeffery Steven Beck, Philomath, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 583 days.

(21) Appl. No.: 11/456,784

(22) Filed: Jul. 11, 2006

(65) Prior Publication Data

US 2008/0012971 A1    Jan. 17, 2008

(51) Int. Cl.
*H04N 5/217* (2006.01)
*H04N 5/228* (2006.01)

(52) U.S. Cl. ............. 348/241; 348/222.1; 348/294
(58) Field of Classification Search ............ None
See application file for complete search history.

(56) References Cited

U.S. PATENT DOCUMENTS

| | | | | |
|---|---|---|---|---|
| 4,860,095 A | * | 8/1989 | Kimura et al. | 348/65 |
| 4,907,084 A | * | 3/1990 | Nagafusa | 348/691 |
| 4,996,601 A | * | 2/1991 | Arimori | 348/294 |
| 5,115,303 A | * | 5/1992 | Hayashi | 348/265 |
| 5,909,243 A | * | 6/1999 | van Acquoij | 348/222.1 |
| 6,747,695 B1 | * | 6/2004 | Afghahi | 348/241 |
| 2003/0193593 A1 | * | 10/2003 | Lee et al. | 348/302 |
| 2007/0200942 A1 | * | 8/2007 | Xu | 348/294 |

* cited by examiner

*Primary Examiner*—Ngoc-Yen T Vu
(74) *Attorney, Agent, or Firm*—RatnerPrestia

(57) ABSTRACT

A delay circuit is provided that delays the sampling signal by a selected amount in order to ensure that sampling does not occur concurrently with the occurrence of a noisy event. The noisy events on the IC tend to be periodic and occur at regular intervals. The invention allows the delay in the sampling signal to be adjusted such that sampling does not occur at the same time as the reoccurring noisy event. This ensures that the sample signals will not have noise in them resulting from the occurrence of the noisy event. In addition, the delay circuit is programmable to allow the amount of delay to be set on the fly.

15 Claims, 4 Drawing Sheets

METHOD AND APPARATUS FOR PROGRAMMABLY SETTING A SAMPLING DELAY IN AN IMAGE SENSOR DEVICE

TECHNICAL FIELD OF THE INVENTION

The invention relates to image sensors. More particularly, the invention relates to programmably setting an amount by which a sampling signal is to be delayed in an image sensor device.

BACKGROUND OF THE INVENTION

An image sensor device is an integrated circuit (IC) having an array of pixels and other circuitry and devices for sampling the pixels, outputting the sample values and processing the sample values. One problem that arises in image sensor ICs is that switching events that occur on the IC may lead to noise on the power supply. The pixels are typically sampled one row at a time during sampling periods. If a switching event or other noisy event occurs while a row of pixels is being sampled, this may lead to noise in the sample signal. This of course is problematic.

Most Complementary Metal Oxide Semiconductor (CMOS) image sensors that implement 4T buried-gate pixel technologies use correlated-double sampling to remove power supply noise present in the reset value of the pixel. With this technique, reset and video voltage values that are independent of the power supply are provided to the analog read-out line. These values must then be sampled and stored on analog storage devices (usually capacitors) that are accessed at a later time for analog-to-digital conversion of the samples and image processing. Because there is only one external route from the pixel to the storage element, the sampling of the reset and video voltage values must occur at two separate instants in time. This provides an opportunity for power supply noise to be added to the sample signal.

The techniques that are used to address this problem are directed to minimizing power supply noise. With one of the techniques, the digital circuits are removed from the image sensor IC and placed in a separate IC. This requires that a signal be driven between the image sensor IC and the digital circuit IC, which involves driving the signal over routes on the circuit board, which increases capacitance and power consumption. In addition, this solution is often cost prohibitive.

Another technique for minimizing power supply noise actively drives the analog power supply low and high to eliminate power supply noise. One of the disadvantages of this technique is that it requires a large amount of power in order to be effective. A special amplifier is needed and the amplifier must be capable of supplying the full power supply current to the power supply. In addition, it also requires a second, wider power supply to provide power for the amplifier.

Another technique for minimizing power supply noise uses separate power and ground nets for all digital and analog circuitry. This is a very complicated power system with multiple regulators, which can also be cost prohibitive. In addition, this technique does not remove substrate noise due to the fact that all of the circuits on the IC share the same ground, i.e., the substrate.

A need exists for a way to prevent power supply noise from affecting the pixel sample signals that is relatively simple to implement, and which is efficient in terms power consumption and area.

SUMMARY OF THE INVENTION

The invention provides a method and an apparatus for delaying an input sampling signal in an image sensor device to produce a delayed sampling signal. The apparatus comprises a controller and a delay circuit. The controller is configured to receive input relating to a length of time by which the input sampling signal is to be delayed and to produce a delay length selection signal based in the received input. The delay circuit is configured to receive the delay length selection signal from the controller and to delay the input sampling signal by a selected length of time based on the delay length selection signal to produce a delayed sampling signal.

The method comprises receiving input relating to a selected length of time by which the input sampling signal is to be delayed, processing the input to produce a delay length selection signal, outputting the delay length selection signal to a delay circuit, and, in the delay circuit, configuring the delay circuit in accordance with the delay length selection signal to produce a delayed sampling signal.

In accordance with one embodiment, the invention provides a computer program for performing an algorithm that produces the delay length selection signal. The program comprises instructions for processing an input relating to a selected length of time by which an input sampling signal is to be delayed to produce a delay length selection signal that is based on the selected length of time, and instructions for outputting the delay length selection signal to a delay circuit that configures itself in accordance with the delay length selection signal to delay an input sampling signal to produce a delayed sampling signal.

These and other features and advantages of the invention will become apparent from the following description, drawings and claims.

DETAILED DESCRIPTION OF AN EXEMPLARY EMBODIMENT

In accordance with the invention, a delay circuit is provided that delays the sampling signal by a selected amount in order to ensure that sampling does not occur concurrently with the occurrence of a noisy event. The noisy events on the IC tend to be periodic and occur at regular intervals. The invention allows the delay in the sampling signal to be adjusted such that sampling does not occur at the same time as the reoccurring noisy event. This ensures that the sample signals will not have noise in them resulting from the occurrence of the noisy event. In addition, the delay circuit is programmable to allow the amount of delay to be set on the fly.

Figure 1:
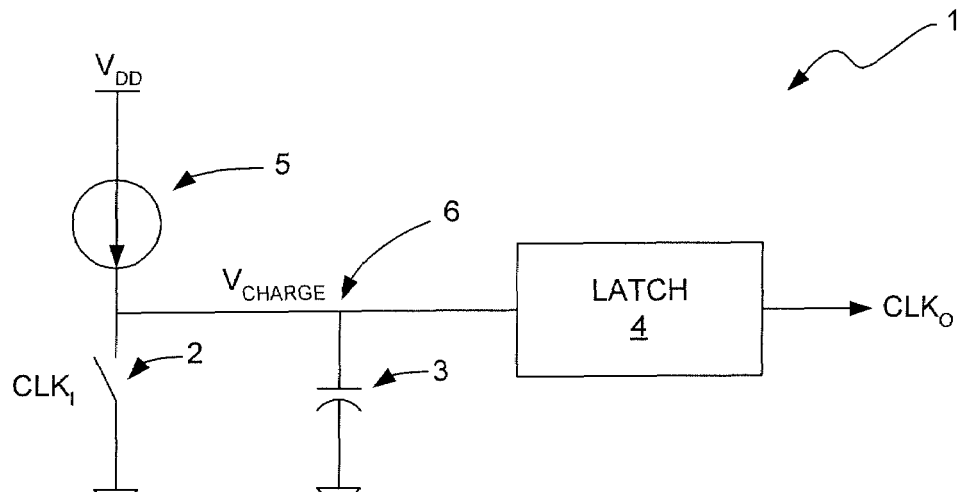
FIG. 1 illustrates a block diagram of the delay circuit of the invention in accordance with one exemplary embodiment.

FIG. 1 illustrates a block diagram of the delay circuit 1 of the invention in accordance with one exemplary embodiment. The delay circuit 1 includes a switch 2, a capacitor 3, a latch 4, and a current source 5. The switch 2 is open when the input clock signal, $CLK_I$, is low and closed when $CLK_I$ is high. The switch 2 is typically a gate (not shown) made up of one or more transistors. The gate is activated when $CLK_I$ is high and deactivated when $CLK_I$ is low. The latch 4 is an inverting latch that inverts the voltage signal, $V_{Charge}$, at node 6 and delays the falling edge of the VCharge signal. The latch 4 also removes any noise in the $V_{Charge}$ signal present at the charging node 6. The output of the latch 4 is an output clock signal, $CLK_O$, which is the delayed sampling signal that will be used to sample the pixels.

Figure 2:
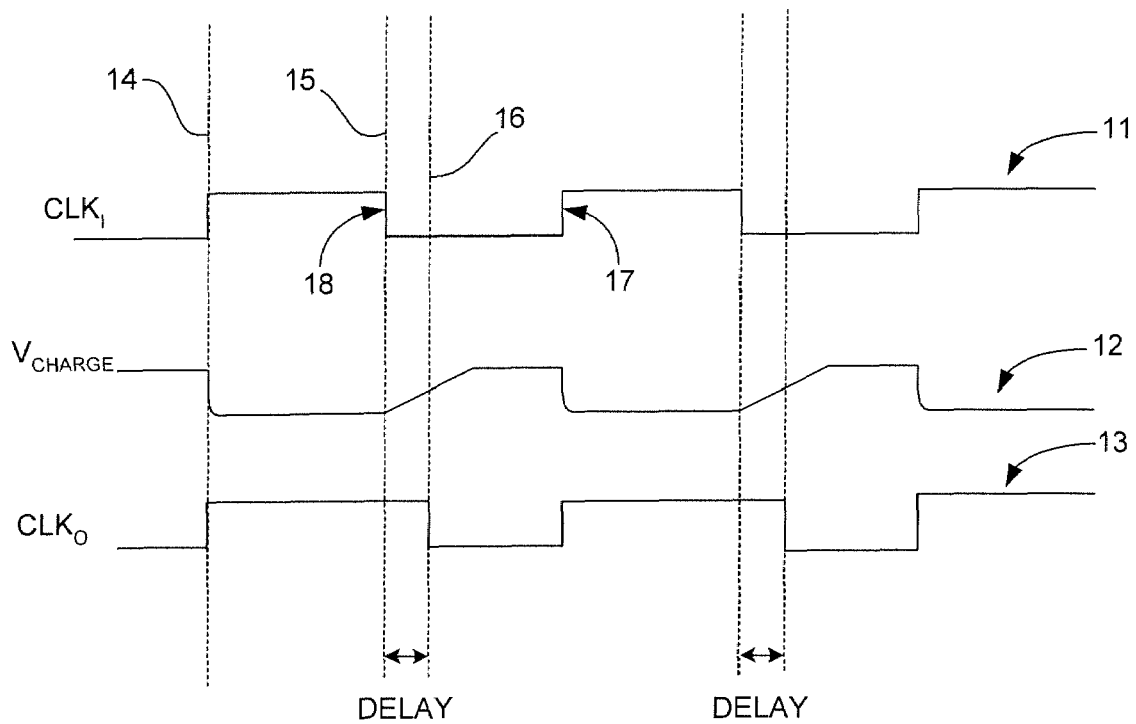
FIG. 2 illustrates a timing diagram that demonstrates the manner in which the delay circuit shown in FIG. 1 operates.

FIG. 2 illustrates a timing diagram that demonstrates the manner in which the delay circuit 1 operates. The top trace 11 represents the input clock signal $CLK_I$. The middle trace 12 represents the voltage signal present at the charging node 6, $V_{Charge}$. The bottom trace 13 represents the output clock signal $CLK_O$. When the input clock signal $CLK_I$ is low, the switch 2 is opened and the capacitor 3 is connected to the supply voltage, $V_{DD}$, through the current source 5. This causes the capacitor 3 to begin charging. When the voltage $V_{Charge}$ on the charging node 6 reaches about one-half of its maximum value, the logic threshold point of the latch 4 is reached and the latch 4 is triggered. This causes the output signal $CLK_O$ to go low. Thus, when $CLK_I$ is low, $CLK_O$ is also low. When the input signal $CLK_I$ goes high (dashed line 14), the switch 2 is closed and the capacitor 3 discharges to ground, i.e., the $V_{Charge}$ signal at node 6 goes low. When the $V_{Charge}$ signal goes low, the output signal $CLK_O$ goes high. When the input signal $CLK_I$ goes low again (dashed line 15), the switch 2 is opened and the capacitor 3 is disconnected from ground. This causes the capacitor 3 to again be charged up by the supply voltage $V_{DD}$ through the current source 5. When the voltage signal at node 6 $V_{Charge}$ reaches about one-half of its maximum value (dashed line 16), the logic threshold point of the latch 4 is reached, and the latch 4 is triggered. This causes the output signal $CLK_O$ to go low.

It can be seen from the timing diagram that the rising edge 17 of the input clock signal $CLK_I$ is not delayed, but the falling edge 18 is delayed, as represented by the arrow between dashed lines 15 and 16. The length of the delay is equal to the amount of time that passes from the instant in time when the capacitor 3 begins charging (when $CLK_I$ transitions from high to low) and the instant in time when the latch 4 is triggered (when $V_{Charge}$ reaches approximately ½ of its maximum value). The delay length is proportional to C/I, where C is the capacitance value of the capacitor 3 and I is the value of the current produced by the current source 5. Therefore, the delay length can be increased by increasing the ratio C/I and decreased by decreasing the ratio C/I. Hence, the delay length can be controlled by varying the capacitance value C and/or the current value I to increase or decrease the ratio C/I.

Figure 3:
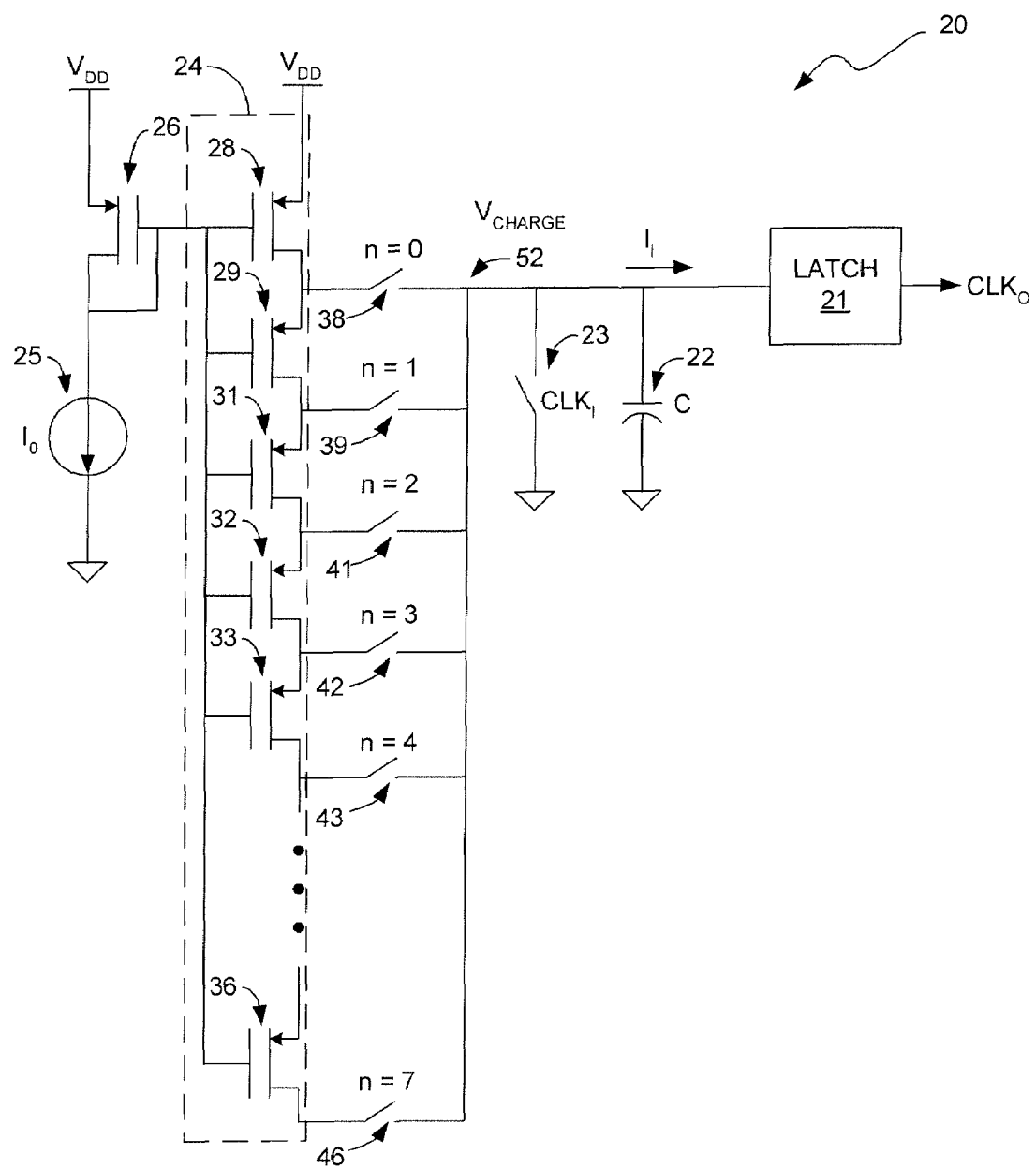
FIG. 3 illustrates a block diagram of the delay circuit of the invention in accordance with another exemplary embodiment.

FIG. 3 illustrates a block diagram of the delay circuit 20 of the invention in accordance with another exemplary embodiment. In accordance with this embodiment, the delay length is varied by varying the value of the starting current $I_0$ while keeping the value of C constant. The delay circuit 20 is similar to the delay circuit 1 shown in FIG. 1 in that it includes an inverting latch 21, a capacitor 22 and a switch 23. The switch 23 is controlled by the input clock signal $CLK_I$. When $CLK_I$ goes high, the switch 23 closes. When $CLK_I$ goes low, the switch 23 opens. The current source 24 of the delay circuit 20 is made up of a plurality of transistor gates 28-36, each of which is selectable by closing a corresponding one of the switches 38-46. The current source 25 and the transistor gate 26 represent the current mirror of the delay circuit 20.

The delay circuit 20 shown in FIG. 3 operates in essentially the same manner as described above with reference to delay circuit 1, except that the current I that charges the capacitor 22 can be varied by selectively closing one of the switches 38-46 while opening the other switches 38-46. Preferably, only one of the switches 38-46 is selected at any given time. The delay circuit 20 has n switches 38-46. In this example, n=7. However, n may be any number greater than or equal to 1. Likewise, the current source 24 has n transistor gates 28-36.

The gate 26 is typically made of a plurality of transistors to provide the gate 26 with a desired width-to-length ratio, $W_0/L_0$, where $W_0$ is the width of the gate 26 and $L_0$ is the length of the gate 26. In this example, the ratio $W_0/L_0$ for the gate 26 is equal to 1. When one of the switches 38-46 is closed, the corresponding one of the gates 28-36 that is turned on has a width, $W_i$, and length, $L_i(n+1)$. Thus, the current source 24 has an aggregate width-to-length ratio of $W_i/L_i(n+1)$. It can be seen from this equation that this ratio decreases as n increases, i.e., when the switch 38-46 that is selected is further down in the stack of transistor gates 28-36. For example, the ratio is at a maximum when switch 38 is selected (n=0) and at a minimum when switch 46 is selected. The magnitude of the ratio affects the current $I_I$, which charges the capacitor 22. The relationship between the current $I_I$ and the starting current $I_0$ can be expressed as:

$$I_I = I_0(W_i/L_i(n+1))/W_0/L_0, \quad \text{(Equation 1)}$$

The ratio $W_0/L_0$ is fixed, so selecting higher n values, decreases $I_I$, which increases the delay length. Conversely, selecting lower n values, increases $I_I$, which decreases the delay length. The relationship between the current $I_I$ and the starting current $I_0$ can be expressed as:

$$I_I = I_0(1/(n+1)), \text{ where } n=\{0, 1, 2, \ldots, m\} \quad \text{(Equation 2)}$$

Like Equation 1, Equation 2 shows that $I_I$ decreases as n increases, and vice versa.

The transistor gates 28-36 preferably are all of the same size to ensure that the delay length is increased and decreased in a uniform manner. For example, assuming $W_i/L_i$ equals 1 for each of the transistor gates 28-36, then for n=1, the ratio $W_i/(L_i(n+1)$ in Equation 1 becomes ½. For n=2, the ratio $W_i/(L_i(n+1))$ in Equation 1 becomes ⅓, and so on.

The delay circuit 20 operates as follows. When the input clock signal $CLK_I$ is low, the switch 23 is opened. Assuming at least one of the switches 38-46 is closed, the capacitor 22 is connected to the supply voltage, $V_{DD}$, through gate 24. This causes the capacitor 22 to begin charging, which triggers the latch 21 at about one-half of the maximum $V_{CHARGE}$ signal level, causing the output signal $CLK_O$ to go low. Thus, when $CLK_I$ is low, $CLK_O$ is also low after the programmed delay. When the input signal $CLK_I$ goes high, the switch 23 is closed and the capacitor 22 discharges to ground, i.e., the $V_{Charge}$ signal at node 52 goes low. When the $V_{Charge}$ signal goes low, the output signal $CLK_O$ from latch 21 goes high. When the input signal $CLK_I$ goes low again, the switch 23 is opened and the capacitor 22 is disconnected from ground. This causes the capacitor 22 to begin being charged by the supply voltage $V_{DD}$ through gate 24. When the voltage signal at node 52

$V_{Charge}$ reaches about one-half of its maximum value, the logic threshold point of the latch 21 is reached, and the latch 21 is triggered. This causes the output signal $CLK_O$ to go low. The timing diagram shown in FIG. 2 also applies to the delay circuit 60 shown in FIG. 3.

Figure 4:
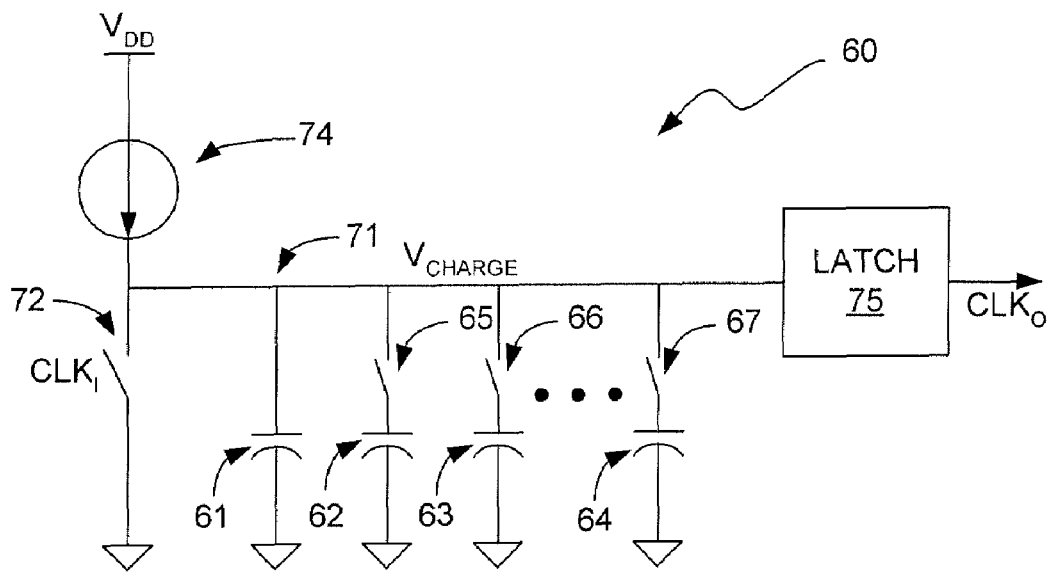
FIG. 4 illustrates a block diagram of the delay circuit of the invention in accordance with another exemplary embodiment.

FIG. 4 illustrates a block diagram of the delay circuit 60 of the invention in accordance with another exemplary embodiment. In accordance with this embodiment, the delay length is changed by keeping the current $I_I$ fixed while selectively varying the capacitance C of the delay circuit 60. The delay circuit 60 includes a plurality of capacitors 61-64. The capacitors 62-64 are connected to charging node 71 via switches 65-67. The capacitor 61 is connected directly to the charging node 71. The delay length produced by the delay circuit 60 is varied by closing one or more of the switches 65-67 to increase the overall capacitance of the circuit 60. Preferably, all of the capacitors 62-64 have the same capacitance values to ensure that the delay length is increased in a uniform manner as one or more of the switches 65-67 are closed. As the number of switches 65-67 that are closed increases, the overall capacitance of the delay circuit 20 increases, which increases the delay length. As the number of switches 65-67 that are closed decreases, the overall capacitance of the delay circuit 20 decreases, which decreases the delay length.

The delay circuit 60 operates as follows. When the input clock signal $CLK_I$ is low, the switch 72 is opened, and the capacitor 61 and any of the capacitors 62-64 that have their respective switches 65-67 closed are connected to the supply voltage $V_{DD}$ through the current source 74. The capacitor 61 and any of the capacitors 62-64 that have their respective switches 65-67 closed begin charging, which triggers the latch 75, causing the output signal $CLK_O$ to go low. Thus, when $CLK_I$ is low, $CLK_O$ is also low after the programmed delay. When the input signal $CLK_I$ goes high, the switch 72 closes and the capacitor 61 and any of the capacitors 62-64 that are connected to the charging node 71 via their respective switches 65-67 then discharge to ground, i.e., the $V_{Charge}$ signal at node 71 goes low. When the $V_{Charge}$ signal goes low, the output signal $CLK_O$ from latch 75 goes high. When the input signal $CLK_I$ goes low again, the switch 72 opens and the capacitor 61 and any of the capacitors 62-64 that are connected to the charging node 71 via their respective switches 65-67 are disconnected from ground. This causes these capacitors to begin being charged up by the supply voltage $V_{DD}$ through the current source 74. When the voltage signal $V_{Charge}$ at node 71 reaches about one-half of its maximum value, the logic threshold point of the latch 75 is reached, and the latch 75 is triggered. This causes the output signal $CLK_O$ to go low.

An alternative to the latch design described above with reference to FIGS. 1-4 would be to have $CLK_I$ and $V_{Charge}$ be inputs to the latch. In this case, the rising edge of the $CLK_I$ triggers the rising edge of $CLK_O$, and the rising edge of the ramp of $V_{Charge}$ triggers the falling edge of $CLK_O$. The effect is essentially the same as described above with reference to FIGS. 1-4, but this latch design may be easier to implement that the latch design described above with reference to FIGS. 1-4.

Figure 5:
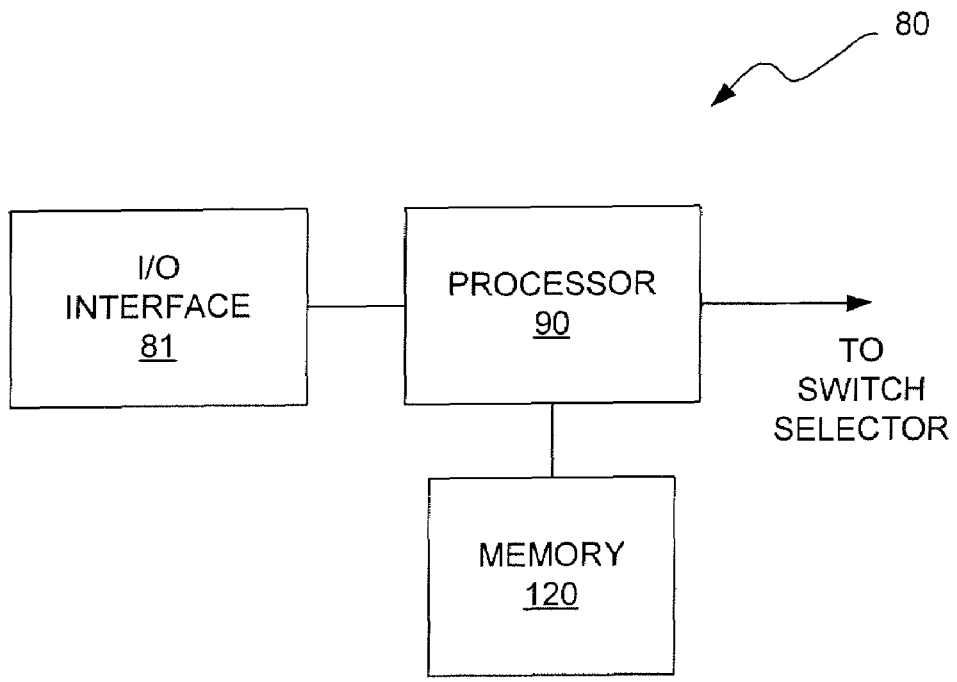
FIG. 5 illustrates a block diagram of a controller of the invention for controlling the selection of the switches shown in FIG. 3 and the switches shown in FIG. 4.

FIG. 5 illustrates a block diagram of a controller 80 of the invention for controlling the selection of the switches 38-46 shown in FIG. 3 and the switches 65-67 shown in FIG. 4. As stated above, the length of the delay can be varied at any time by varying which of these switches are opened or closed, i.e., turned on or off. The controller 80 has an input interface 81 for receiving an input signal corresponding to a delay length selection made by a user, and a processor 90 that processes the received input signal to produce an output signal that controls turning on and off the switches 38-46 and 65-67. The output signal is typically a multi-bit signal that is used by a switch selector (not shown) of the delay circuit, which may be a multiplexer, for example, to select the switches 38-46 and 65-67.

The controller 80 may also include a memory device 120 for storing computer code for implementing the algorithm for varying delay length. This algorithm is performed by the processor 90. The processor 90 may be implemented solely in hardware or in a combination of hardware and software or firmware. The term "processor", as that term is used herein, is intended to denote any type of computational device capable of performing the algorithm. As stated above, the delay length can be varied at anytime. To vary the delay length, a user provides an input to the processor 90 via the interface 81. The processor 90 processes the input and decides whether one or more of the gates 38-46 and 65-67 need to be turned on or turned off, and provides an output signal to the switch selector of the delay circuit to cause the appropriate gates to be turned on or off. It should be noted that although a user may provide the input to the processor 90 that results in a particular delay length, the invention does not require input from a user. Rather, the delay length may be selected automatically by the processor 90 based on some other information that is obtained by the processor 90. For example, the processor 90 may be part of a feedback loop that automatically adjusts the delay length based on data relating to the performance of the image sensor device. In this case, the input provided to the processor 90 is from a source other than a user.

Figure 6:
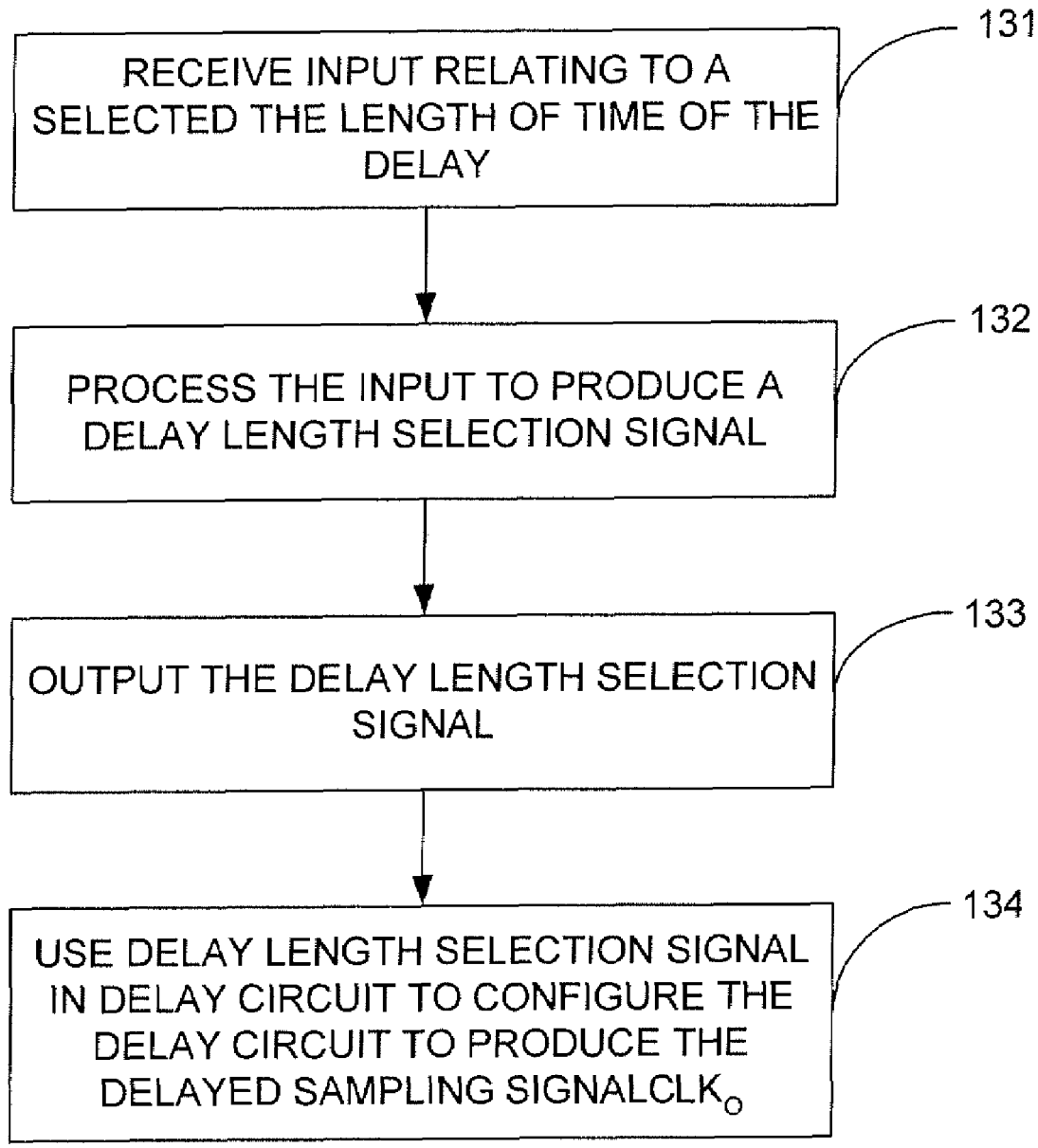
FIG. 6 illustrates a flowchart that represents the method of the invention in accordance with an exemplary embodiment.

FIG. 6 illustrates a flowchart that represents the method of the invention in accordance with an exemplary embodiment. First, the length of time of the delay is selected. As stated above, the length of time of the delay may be selected by a user who inputs a delay length selection to the controller 80 via the interface 81. The input relating to the selection is received, as indicated by block 131. The input is then processed to produce a delay length selection signal, as indicated by block 132. The delay length selection signal is then output to the delay circuit, as indicated by block 133. The delay circuit uses the delay length selection signal to configure the switches to cause the input sampling signal $CLK_I$ to be delayed to produce the delayed sampling signal $CLK_O$, as indicated by block 134.

It should be noted that the invention has been described with reference to exemplary embodiments for the purpose of demonstrating the principles and concepts of the invention. Those skilled in the art will understand, in view of the description provided herein, the manner in which modifications may be made to these embodiments, and that all such modifications are within the scope of the invention. For example, the circuit configurations shown in FIGS. 3 and 4 can be modified without deviating from the principles and concepts of the invention. Also, it is not necessary for the falling edge of the sampling signal to be delayed. The rising edge could be delayed instead. In addition, while the latch has been described as being an inverting latch for exemplary purposes, the latch may be an inverting or non-inverting latch. Other similar modifications may be made and all such modifications are within the scope of the invention.

What is claimed is:

1. An apparatus for delaying a sampling signal used to sample pixels in an image sensor device, the apparatus comprising:

a controller configured to receive input relating to a length of time by which an input sampling signal is to be delayed and to produce a delay length selection signal that is based on the received input; and a delay circuit configured to receive the delay length selection signal from the controller and to delay an input sampling signal by a selected length of time based on the delay length selection signal to produce a delayed sampling signal;

wherein the delay circuit comprises a current source that produces an electrical current $I_I$;

at least one capacitor having a first terminal connected to a charging node and a second terminal connected to ground;

at least one switch connected between ground and the charging node, said at least one switch being turned on or off by the delay length selection signal, wherein when said at least one switch is turned off, said at least one capacitor charges thereby causing the voltage level on the charging node to increase, and wherein when said at least one switch is turned on, said at least one capacitor discharges to ground thereby causing the voltage level on the charging node to decrease; and a latch having an input connected to the charging node and an output for outputting the delayed sampling signal, the latch having a triggering threshold level such that when the voltage level on the charging node reaches the threshold level of the latch, the latch outputs the delayed sampling signal.

2. The apparatus of claim 1, wherein the delay circuit comprises a plurality of switches and a plurality of transistor gates connected to the delay circuit by the switches, and wherein the current $I_I$ is varied by selectively turning the switches on or off in accordance with the delay length selection signal to connect respective ones of the transistor gates to the delay circuit, and wherein varying the current $I_I$ causes the delay length of time to be varied.

3. The apparatus of claim 1, wherein the delay circuit comprises a plurality of switches and a plurality of capacitors, and wherein the delay circuit has an overall capacitance associated with the capacitors, the overall capacitance being varied by selectively turning the switches on or off in accordance with the delay length selection signal, and wherein varying the overall capacitance causes the delay length of time to be varied.

4. The apparatus of claim 1, wherein the controller comprises:

an input interface for receiving the input relating to the length of time by which the input sampling signal is to be delayed; and a processor configured to process the input received in the input interface to produce the delay length selection signal, the processor outputting the delay length selection signal to the delay circuit.

5. The apparatus of claim 4, wherein the input relating to the delay length variation is input by a human user.

6. The apparatus of claim 4, further comprising:

a memory device configured to store computer code to be executed by the processor, the computer code comprising an algorithm for producing the delay length selection signal based on the input received by the processor in the input interface.

7. The apparatus of claim 4, wherein the processor and the input interface are implemented in hardware.

8. The apparatus of claim 4, wherein the processor and the input interface are implemented in a combination of hardware and firmware.

9. A method for delaying a sampling signal used to sample pixels in an image sensor device, the method comprising:

receiving an input relating to a selected a length of time by which an input sampling signal is to be delayed;

processing the received input to produce a delay length selection signal;

outputting the delay length selection signal to a delay circuit; and in the delay circuit, receiving the delay length selection signal and configuring the delay circuit in accordance with the delay length selection signal to delay an input sampling signal by a selected length of time to produce a delayed sampling signal;

wherein the delay circuit comprises:

a current source that produces an electrical current $I_I$;

at least one capacitor having a first terminal connected to a charging node and a second terminal connected to ground;

at least one switch connected between ground and the charging node, the delay circuit being configured by turning said at least one switch on or off based on a value of the delay length selection signal, wherein when said at least one switch is turned off, said at least one capacitor charges thereby causing the voltage level on the charging node to increase, and wherein when the switch is turned on, said at least one capacitor discharges to ground thereby causing the voltage level on the charging node to decrease; and a latch having an input connected to the charging node and an output for outputting the delayed sampling signal, the latch having a triggering threshold level such that when the voltage level on the charging node reaches the threshold level of the latch, the latch outputs the delayed sampling signal.

10. The method of claim 9, wherein the delay circuit comprises a plurality of switches and a plurality of transistor gates connected to the delay circuit by the switches, and wherein the current $I_I$ is varied by selectively turning the switches on or off in accordance with the delay length selection signal to connect respective ones of the transistor gates to the delay circuit, and wherein varying the current $I_I$ causes the delay length of time to be varied.

11. The method of claim 9, wherein the delay circuit comprises a plurality of switches and a plurality of capacitors, and wherein the delay circuit has an overall capacitance associated with the capacitors, the overall capacitance being varied by selectively turning the switches on or off in accordance with the delay length selection signal, and wherein varying the overall capacitance causes the delay length of time to be varied.

12. The method of claim 9, wherein the step of processing the selecting the length of time to produce the delay length selection signal comprises:

in an input interface of a controller, receiving input for selecting the length of time by which the input sampling signal is to be delayed; and in a processor of the controller, processing the input received in the input interface to produce the delay length selection signal, the processor outputting the delay length selection signal to the delay circuit.

13. The method of claim 12, wherein the input for selecting the length of time by which the input sampling signal is to be delayed is input to the controller by a human user.

14. The method of claim 12, wherein the processor and the input interface are implemented in hardware.

15. The method of claim 12, wherein the processor and the input interface are implemented in a combination of hardware and firmware.

* * * * *